US011814029B2

(12) United States Patent
Fay, II (10) Patent No.: US 11,814,029 B2
(45) Date of Patent: Nov. 14, 2023

(54) CASTER WHEEL ORIENTATION SENSOR ASSEMBLY

(71) Applicant: CNH Industrial America LLC, New Holland, PA (US)

(72) Inventor: Jeffrey Brown Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/975,681

(22) Filed: Oct. 28, 2022

(65) Prior Publication Data

US 2023/0046537 A1    Feb. 16, 2023

Related U.S. Application Data

(62) Division of application No. 16/577,477, filed on Sep. 20, 2019, now Pat. No. 11,511,727.

(51) Int. Cl.
| | |
|---|---|
| *B60W 10/20* | (2006.01) |
| *A01B 69/00* | (2006.01) |
| *B60B 33/00* | (2006.01) |
| *B62D 15/02* | (2006.01) |
| *A01D 41/127* | (2006.01) |

(52) U.S. Cl.
CPC ........... *B60W 10/20* (2013.01); *A01B 69/007* (2013.01); *A01D 41/127* (2013.01); *B60B 33/0028* (2013.01); *B60B 33/0039* (2013.01); *B60B 33/0068* (2013.01); *B62D 15/023* (2013.01); *B60W 2300/158* (2013.01)

(58) Field of Classification Search
CPC ............ B60W 10/20; B60W 2300/158; A01B 69/007; A01D 41/127; B60B 33/0028; B60B 33/0039; B60B 33/0068; B62D 15/023; B60Y 2200/222
See application file for complete search history.

(56) References Cited

U.S. PATENT DOCUMENTS

| | | | |
|---|---|---|---|
| 5,820,148 A | 10/1998 | Yamazaki et al. | |
| 6,852,061 B2 | 2/2005 | Schoon | |
| 8,449,424 B2 | 5/2013 | Schoon | |
| 8,733,770 B2 | 5/2014 | Nafziger et al. | |
| 2006/0022420 A1 | 2/2006 | Pressler et al. | |
| 2014/0073466 A1* | 3/2014 | Berruet | F16C 35/063 |
| | | | 474/94 |
| 2014/0262559 A1 | 9/2014 | DeChristopher et al. | |
| 2015/0223386 A1 | 8/2015 | Nafziger et al. | |
| 2015/0266342 A1 | 9/2015 | Howard et al. | |

* cited by examiner

*Primary Examiner* — Tyler J Lee
(74) *Attorney, Agent, or Firm* — Peter Zacharias (57) ABSTRACT

A system for sensing the angular position of a caster wheel includes a sensor mounted on a bearing which supports a shaft aligned with the rotational axis of the caster. A target on the shaft is detected by the sensor which generates signals indicative of the presence or absence of the target. The position of the target is coordinated with the position of the caster wheel such that the signals are indicative of the angular position of the caster wheel. The target may be a groove extending partially around the shaft and a remaining ungrooved portion of the shaft.

6 Claims, 8 Drawing Sheets

CASTER WHEEL ORIENTATION SENSOR ASSEMBLY

FIELD OF THE INVENTION

This invention relates to caster sensor systems for vehicle steering control.

BACKGROUND

Harvesters such as windrowers, tractors, and forage harvesters, have to operate effectively in different operational modes (e.g., field mode and high-speed mode for road transport). Typical construction for such vehicles include front ground wheels mounted on the frame at fixed angles parallel to each other and parallel to a center line of the frame and rear ground wheels each mounted on a respective caster. Each of the front ground wheels is typically driven by a respective drive motor which allows variable speed in both the forward and reverse directions such that steering of the harvester is effected by a difference in speed between the front wheels with the rear wheels following the steering in a castering action. This is known as "differential steering".

Conventional harvesters generally use differential steering for both in-field operation mode and high-speed road transport operation mode. Differential steering generally operates by varying the speed of the two front drive wheels in order to steer the harvester. The left wheel slows while the right wheel speeds up to turn left, while the right wheel slows and the left wheel speeds up to turn right. Combined with passively castering rear wheels, this enables the conventional harvester to perform zero radius spin turns in the field, which is desirable for optimum field efficiency and maneuverability. However, stability concerns arise during high-speed road transport (e.g., speeds greater than 24 mph) when only differential steering is used. This is due to several factors, including variable ground drive motor/pump efficiency, lack of steering feedback to the driver, dynamics of the harvester which uses the front wheels to steer with no stabilizing effect provided by the rear wheels. Stability at higher speeds may be increased by actively steering of one or both of the rear wheels. However, to prevent damage to the structural and mechanical components associated with the rear wheels it is advantageous to determine the angular orientation of the wheels relatively to the rear axle, and allow the switch from caster operation to active steering of the rear wheels only when the rear wheels are in a known position trailing the rear axle. There is clearly a need for a system which determines the orientation of rear castering wheels and permits the mode of vehicle steering to change only when the castering wheels are properly oriented.

SUMMARY

In one aspect the invention concerns a caster wheel orientation sensor assembly. In an example embodiment the assembly comprises a wheel arm having first and second ends oppositely disposed. A wheel is attached to the first end of the wheel arm. The wheel is rotatable about a first axis. A shaft is fixedly attached to the second end of the wheel arm and is oriented transversely to the first axis. A sensor target is positioned on the shaft. A bearing defines a bore. The shaft is received within the bore. The shaft is rotatable about a second axis oriented coaxially with the bore. A sensor is mounted on the bearing. The sensor is adapted to sense a presence or absence of the sensor target upon rotation of the shaft and generate signals indicative of the presence or the absence of the sensor target.

In an example embodiment the sensor target comprises a groove extending about a portion of a circumference of the shaft. In a practical example the groove subtends an angle between 270° and 300° about the shaft. In a particular example the groove subtends an angle of 285° about the shaft. In a further example, the groove may have a uniform depth over its entire extent, or the groove may have a non-uniform depth. In an example embodiment the groove comprises a first portion having a depth which increases with distance about the circumference, a second portion having a uniform depth, and a third portion having a depth which increases with distance about the circumference. In this example the second portion is positioned between the first and third portions. By way of further example the depth of the first portion and the depth of the second portion may increase linearly with the distance about the circumference. In another example embodiment the sensor target comprises a recess in the shaft. By way of further example, the recess comprises a flat surface. In a particular example embodiment the flat surface extends across a chord of a cross section of the shaft.

In an example embodiment the groove is positioned within the bearing and may also be positioned distal to the second end of the wheel arm. In an example embodiment the sensor comprises a proximity sensor. In a practical example the sensor may be a Hall effect sensor, a capacitive sensor, an inductive sensor, an optical sensor or an ultrasonic sensor.

The invention further encompasses a shaft orientation sensor assembly. In an example embodiment the assembly comprises a shaft having a groove extending about at least a portion of a circumference thereof. A bearing defines bore in which the shaft is received. The shaft is rotatable about an axis oriented coaxially with the bore. A sensor is mounted on the bearing proximate to the groove. The sensor is adapted to sense a depth of the groove upon rotation of the shaft and generate signals indicative of the depth of the groove.

An example sensor assembly according to the invention may further comprise a wheel arm having first and second ends oppositely disposed. A wheel is attached to the first end of the wheel arm. The wheel is rotatable about a wheel axis. The shaft is fixedly attached to the second end of the wheel arm and oriented transversely to the wheel axis in this example. In a further example embodiment the groove is positioned within the bearing and also may be positioned distal to the second end of the wheel arm.

In an example embodiment the sensor comprises a proximity sensor including examples such as Hall effect sensors, capacitive sensors, inductive sensors, optical sensors and ultrasonic sensors.

The invention also encompasses a harvester having a caster wheel orientation sensor system. In an example embodiment the harvester comprises a chassis and a first wheel arm having first and second ends oppositely disposed. A first wheel is attached to the first end of the first wheel arm. The first wheel is rotatable about a first wheel axis. A first shaft is fixedly attached to the second end of the first wheel arm and is oriented transversely to the first wheel axis. A sensor target is positioned on the shaft. A first bearing defines a first bore. The first shaft is received within the first bore. The first shaft is rotatable about a first shaft axis oriented coaxially with the first bore. The first bearing is mounted on the chassis. A sensor is mounted on the first bearing. The sensor is adapted to sense a presence or absence of the sensor target upon rotation of the first shaft and generate signals indicative of the presence or the absence of the groove. A controller is mounted on the chassis. The controller is adapted to receive the signals.

In an example embodiment the sensor target comprises a groove extending about a portion of a circumference of the shaft. In a practical example the groove may subtend an angle between 270° and 300° about the shaft. Further by way of example the groove may subtend and angle of 285° about the shaft. In particular example embodiments the groove may have a uniform depth over its entire extent or the groove may have a non-uniform depth. By way of example, the groove may comprise a first portion having a depth which increases with distance about the circumference, a second portion having a uniform depth, and a third portion having a depth which increases with distance about the circumference. In an example the second portion is positioned between the first and third portions. By way of example the depth of the first portion and the depth of the second portion increase linearly with the distance about the circumference.

In an example embodiment the groove is positioned within the first bearing and may also be positioned distal to the second end of the wheel arm. By way of example the sensor may comprise a proximity sensor such as a Hall effect sensor, a capacitive sensor, an inductive sensor, an optical sensor or an ultrasonic sensor.

In an example embodiment the harvester may further comprise a second wheel arm having first and second ends oppositely disposed. A second wheel is attached to the first end of the second wheel arm. The second wheel is rotatable about a second wheel axis. A second shaft is fixedly attached to the second end of the second wheel arm and is oriented transversely to the second wheel axis. A second bearing defines a second bore. The second shaft is received within the second bore. The second shaft is rotatable about a second shaft axis oriented coaxially with the second bore. An actuator acts between the chassis and one of the first and second shafts. The actuator is adapted to rotate one of the first and second shafts for steering the harvester. The controller is adapted to prevent the actuator from rotating the one of the first and second shafts upon receipt of the signals from the sensor indicative of the presence or the absence of the sensor target. In an example embodiment of a harvester the sensor target comprises a recess in the shaft. By way of further example, the recess comprises a flat surface. In a particular example the flat surface extends across a chord of a cross section of the shaft.

DETAILED DESCRIPTION

Figure 1:
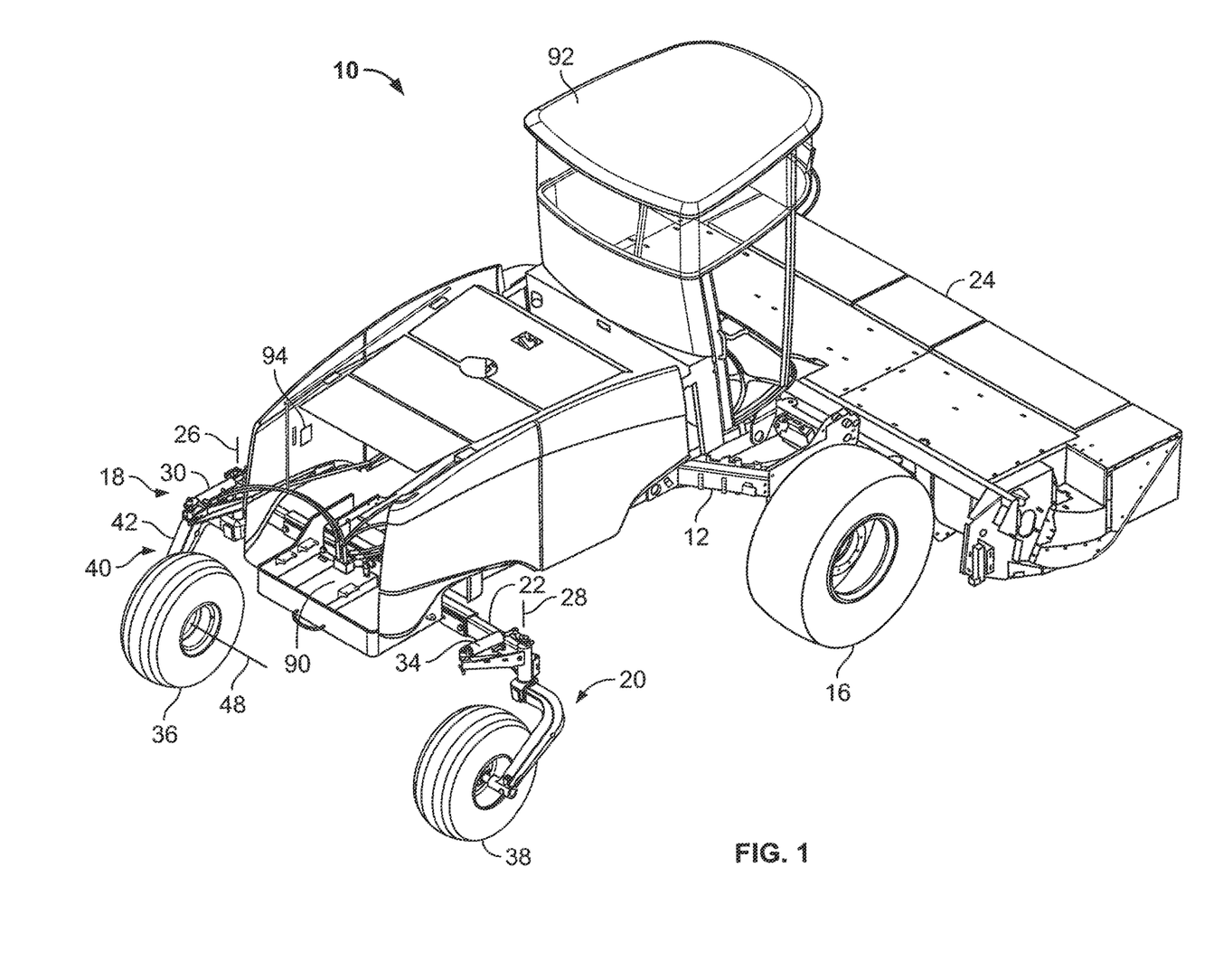
FIG. 1 is an isometric view of an example harvester having an example caster wheel orientation sensor assembly according to the invention.
Figure 2:
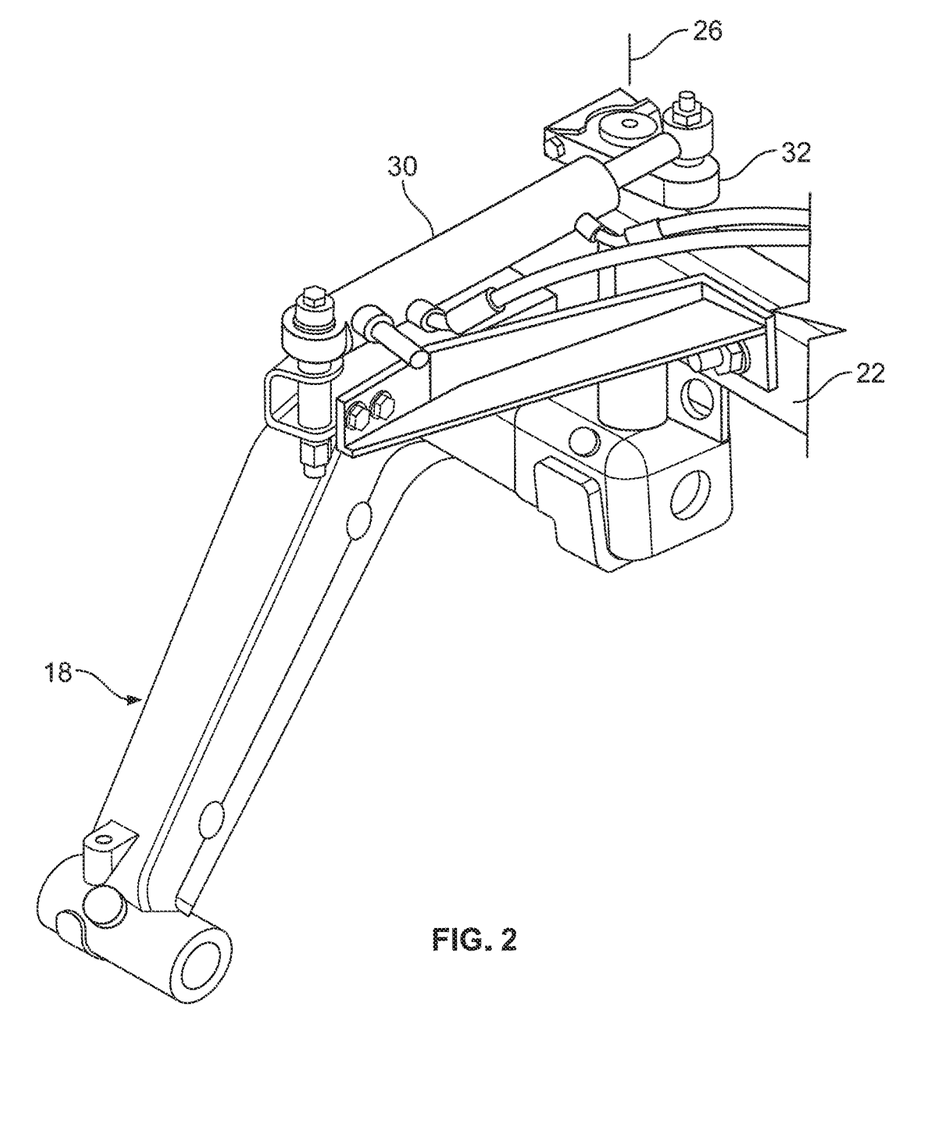
FIGS. 2 and 3 are isometric views of a caster assembly used on the harvester shown in FIG. 1.

FIG. 1 shows an example embodiment of a harvester, in this example a windrower 10 according to the invention. Windrower 10 comprises a chassis 12 on which two powered wheels 14 (not visible) and 16 and two unpowered casters 18 and 20 are mounted via a rear axle 22. As is well understood, windrower 10 is powered by a diesel or gasoline engine which drives hydraulic pumps which in turn drive hydraulic motors which supply motive power to the powered wheels 14 and 16 as well as the cutter head 24 mounted on chassis 12. Windrower 10 can be steered in two different modes as disclosed in U.S. patent application Ser. No. 16/200,324, titled "Steering Control System for Harvester and Methods of Using the Same", filed Nov. 26, 2018 and hereby incorporated by reference herein. In the "field mode", the casters 18 and 20 rotate freely about their respective caster axes 26 and 28, and steering is effected by turning the powered wheels 14 and 16 at different speeds, the direction of the turn being toward the slower moving wheel. In the "high speed mode", used for travel over roads, the steering is augmented by actively steering at least one of the casters (caster 18 in this example). Active steering of the caster 18 increases the stability of the harvester 10 in turns and is effected via a steering actuator 30. As shown in detail in FIG. 2, steering actuator 30 in this example comprises a hydraulic actuator which acts between the rear axle 22 and a steering arm 32 of the caster 18. As shown in FIG. 1, it is further advantageous to damp the rotation of the non-steering caster 20 about caster axis 28 using a damper, such as a shock absorber 34 for enhanced stability.

Switching from field mode steering (free caster rotation of caster 18) to high speed mode (active steering of caster 18) cannot be permitted unless the caster wheels 36 and 38 are "behind" (rearward) of the rear axle 22 as shown in FIG. 1. To prevent switching in the absence of the required caster positions a sensor assembly and control system are used.

Figure 3:
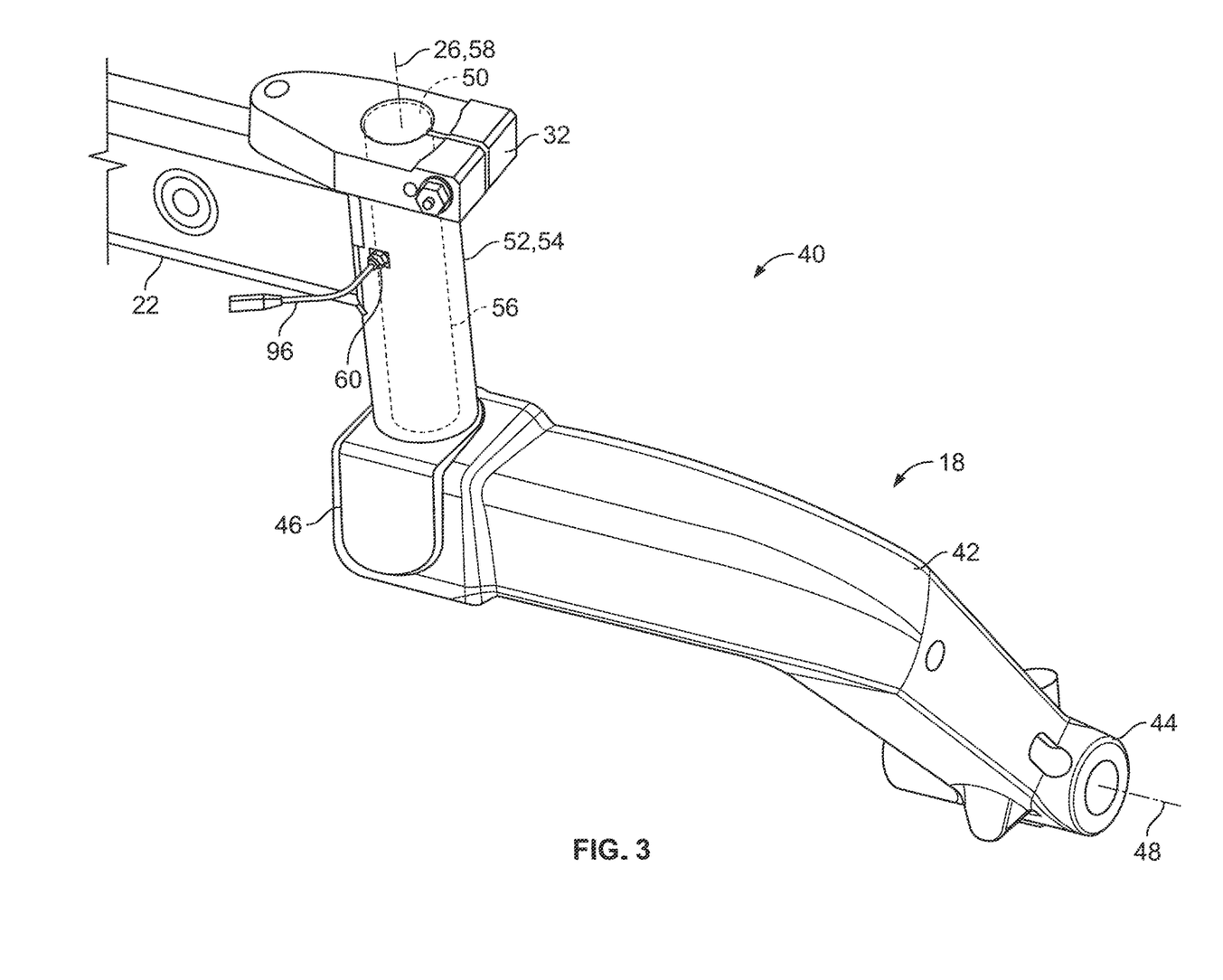

An example sensor assembly 40 according to the invention is shown in FIGS. 1 and 3. Sensor assembly 40 comprises a wheel arm 42 having respective first and second ends 44 and 46 oppositely disposed. Caster wheel 36 is attached to the first end 44 of wheel arm 42, the caster wheel being free to rotate about a wheel axis 48. A shaft 50 is fixedly attached to the second end 46 of the wheel arm 42. Shaft 50 is oriented transversely to the wheel axis 48. A bearing 52 is mounted on the rear axle 22, which, in turn, is mounted on chassis 12. In this example bearing 52 comprises a tube 54 which defines a bore 56 which receives the shaft 50. Shaft 50 is rotatable within bore 56 about a shaft axis 58 which is oriented coaxially with bore 56 and also coincides with caster axis 26. Note that for proper caster action the wheel axis 48 trails the caster and shaft axes 26 and 58 as established by the geometry of wheel arm 42. Rotation of the wheel arm 42 about the caster axis 26 can thus position the caster wheel 36 forward or reward of the rear axle 22, and this position of the caster wheel determines whether or not the steering mode may be switched from the field mode (free rotation about the caster axis 26) to the high speed mode (active steering of caster 18). The position of the caster wheel 36 relative to the rear axle 22 may be determined by the angular orientation of the shaft 50 using a sensor 60. In an example according to the invention, sensor 60 may be a proximity sensor, for example, a Hall effect sensor, a capacitive sensor, an inductive sensor, an optical sensor or an ultrasonic sensor. In a practical design for a harvester, inductive sensors are advantageous for their dependability and robustness.

Figure 4:
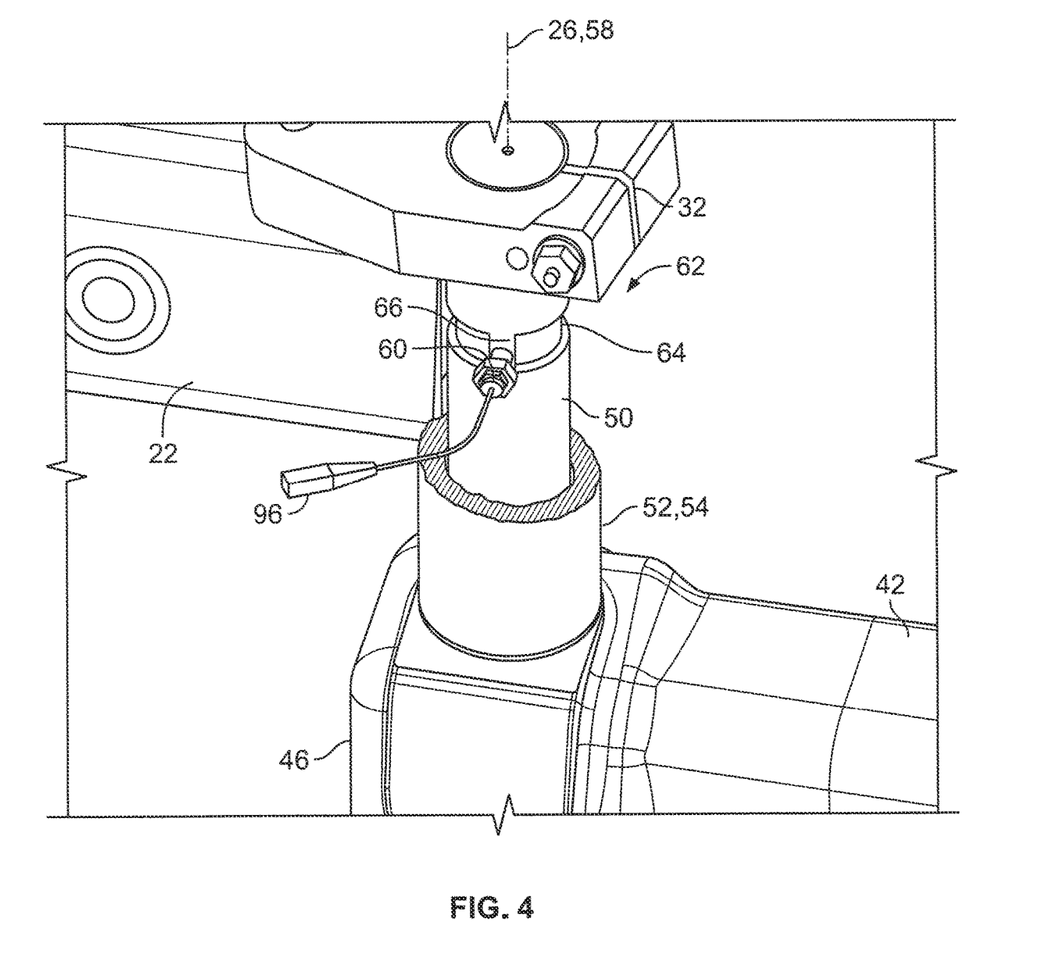
FIGS. 4 and 5 are isometric views of a portion of a caster assembly on an enlarged scale illustrating operation of an example caster wheel orientation sensor assembly according to the invention.
Figure 5:
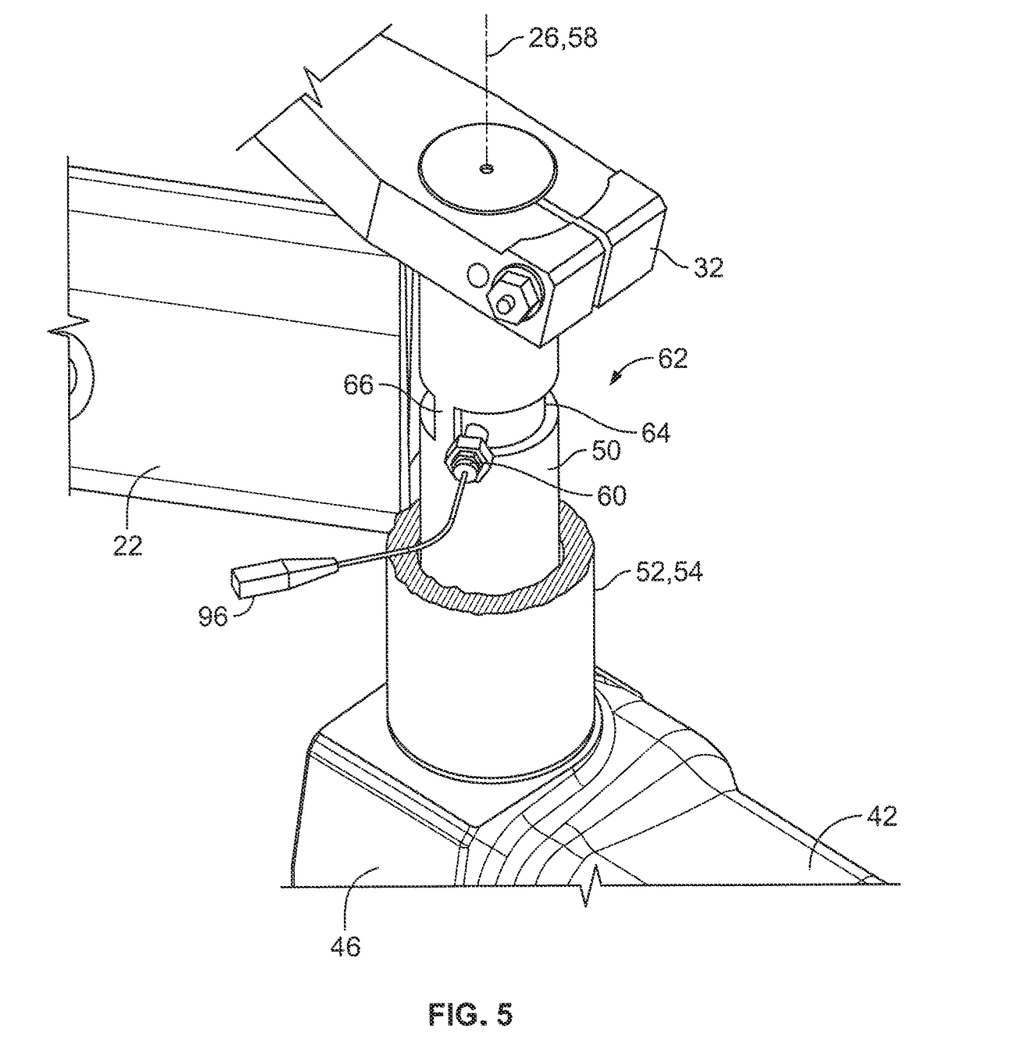

As shown in FIG. 3, the sensor 60 is mounted on the bearing 52 (tube 54) such that it has access to the bore 56 and thus the shaft 50 thereby allowing the sensor to determine the position of the shaft 50 and thus of the caster wheel 36 (see also FIG. 1) relative to the caster axis 26. In this example embodiment shaft 50 is configured to provide a target which is readily detectable by the sensor 60. In the example embodiment shown in FIGS. 4 and 5 the sensor target 62 comprises a groove 64 which extends about only a portion of the circumference of the shaft 50, leaving a remaining portion 66 of the shaft at a larger diameter. Proximity sensor 60 can thus easily detect the presence or absence of the groove 64. The extent of the groove 64 relative to the ungrooved portion 66 can be adjusted depending on which element (groove 64 or ungrooved portion 66) is used to indicate the range of angular positions of the caster wheel 36 over which active steering of a caster is permitted or forbidden. For a practical design as shown in FIGS. 4 and 5, the ungrooved portion 66 is used to indicate the angular range of positions of the caster wheel wherein active steering is permitted. For such a design the groove 64 may subtend an angle between about 270° and about 300° about shaft 50, with a subtended angle of about 285° being advantageous. Fixing the subtended angle of groove 64 also establishes the subtended angle of the ungrooved portion 66. Note that the shaft 50 must be attached to the wheel arm 42 with the groove 64 and ungrooved portion 66 oriented relatively to both the sensor 60 and the caster wheel 36 such that the sensor senses the true position of the caster wheel relative to the rear axle 22. It is further advantageous to position the sensor target 62 (groove 64 and ungrooved portion 66) within the bearing 52 (tube 54) and distal to the second end 46 of wheel arm 42 to prevent fouling of the sensor target and damage to the sensor 60.

Figures 6, 7:
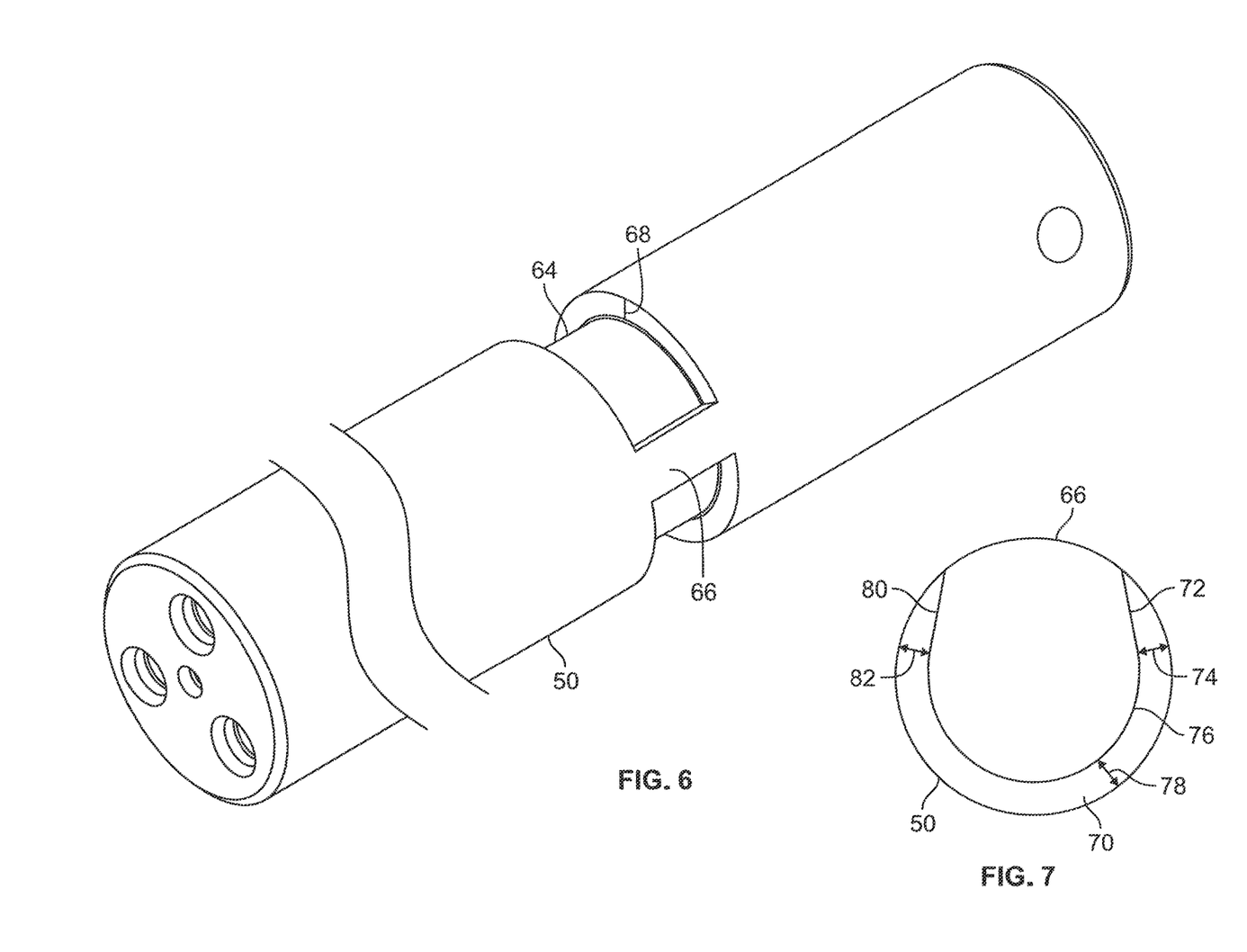
FIG. 6 is an isometric view of a component of the example caster and sensor assembly used in FIGS. 4 and 5.
FIG. 7 is a cross sectional view of an example alternate embodiment of a component of an example caster and sensor assembly according to the invention.

FIG. 6 shows the shaft 50 used in the example caster wheel orientation sensor assembly embodiment of FIGS. 4 and 5 wherein the groove 64 has a uniform depth 68 over its entire extent around shaft 50. FIG. 7 shows another example shaft 50 wherein the groove 70 has a non-uniform depth. Groove 70 comprises a first portion 72 having a depth 74 which increases with distance about the circumference of shaft 50; a second portion 76 having a uniform depth 78, and a third portion 80 having a depth 82 which also increases with distance about the shaft's circumference. In this example the depths 74 and 82 of the first and third portions increase linearly with distance around the circumference of shaft 50, it being understood that other functional relations between the depth and position around the circumference of shaft 50 are also feasible.

Figure 8:
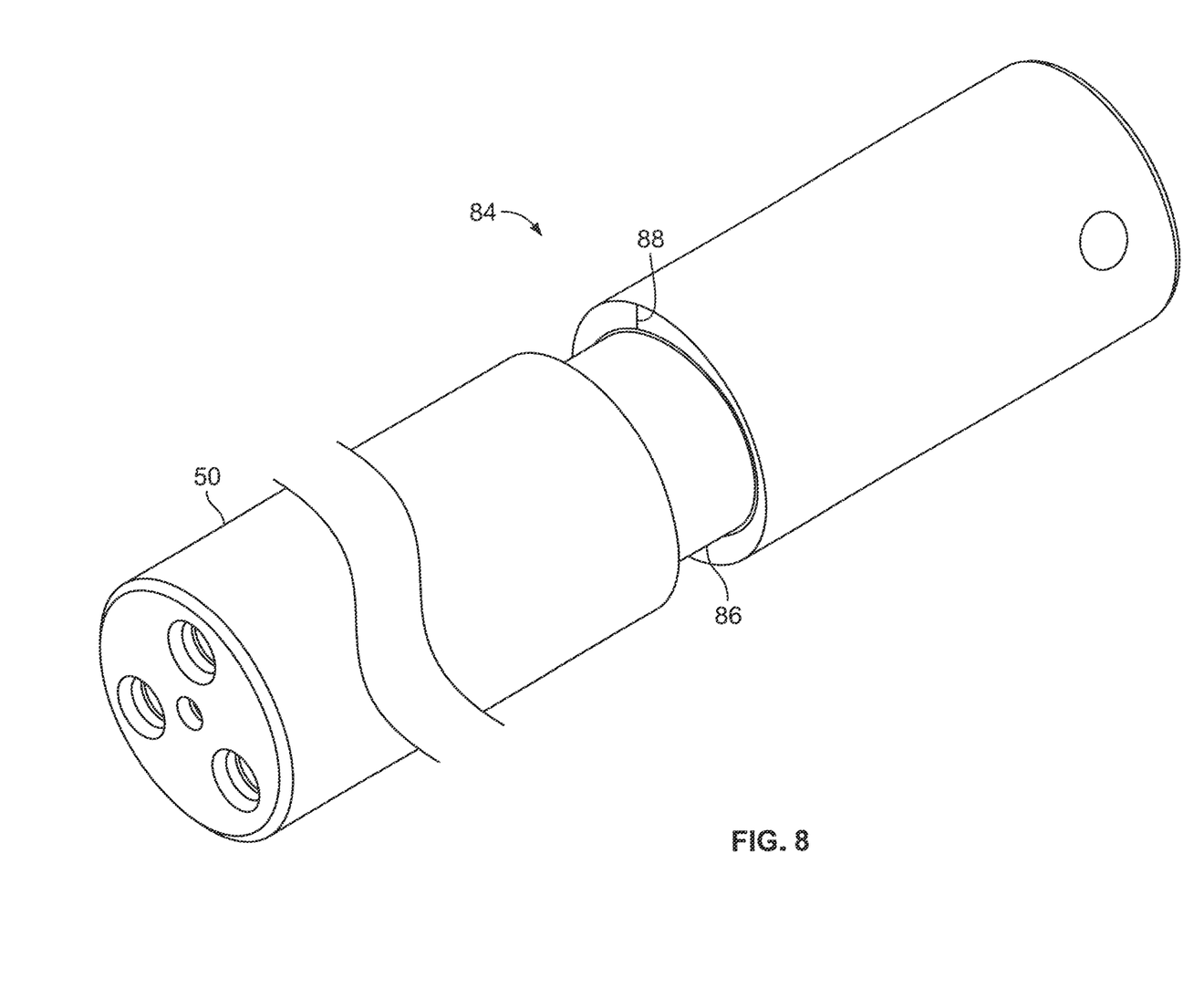
FIG. 8 is an isometric view of an alternate example embodiment of a component of a caster and sensor assembly according to the invention.

FIG. 8 shows another embodiment of a sensor target 84 which takes the form of a continuous groove 86 having a varying depth 88 over its entire extent around shaft 50. In this example embodiment the sensor may be adapted to sense the depth of the groove and generate signals indicative of the depth. The varying depth may then be coordinated with the position of the caster wheel 36 to provide a range of values over which active steering is permitted or not permitted.

Figure 9:
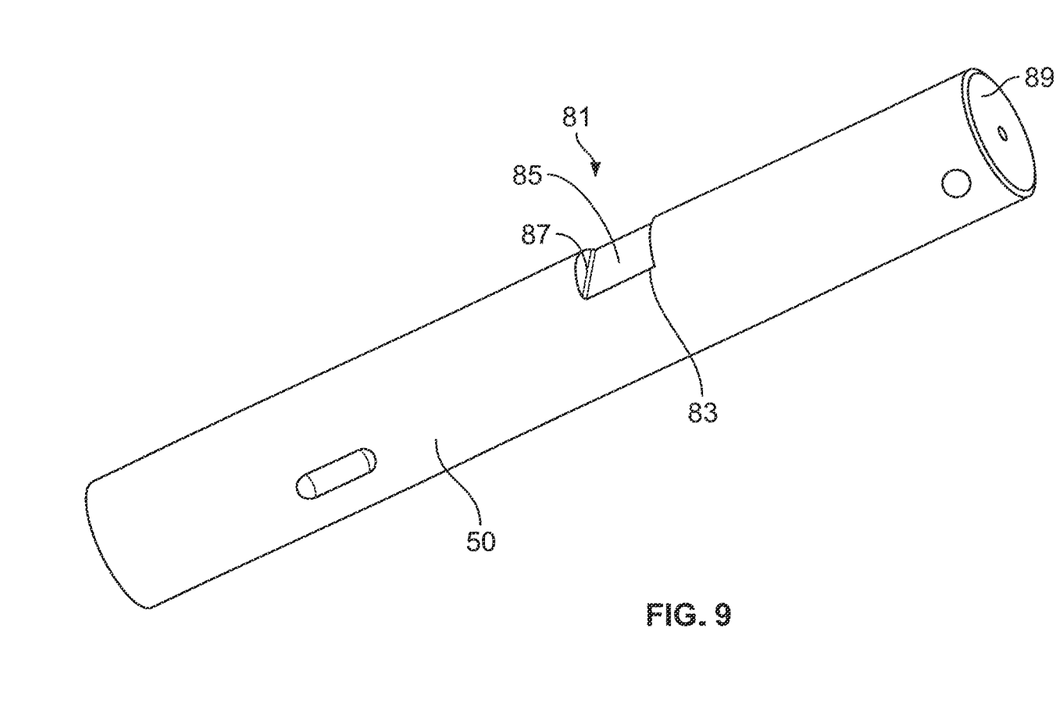
FIG. 9 is an isometric view of an alternate example embodiment of a component of a caster and sensor assembly according to the invention.

FIG. 9 shows another embodiment of a sensor target 81 which comprises a recess 83 in the shaft 50. In this example recess 83 comprises a flat surface 85 situated below the circumferential surface of shaft 50. Flat surface 85 extends across a chord 87 of the shaft's cross section 89 in this example.

Operation of the caster wheel orientation sensor assembly is described with reference to the windrower 10 shown in FIG. 1. In this example the sensor 60 and the steering actuator 30 operate on the same caster 18 (see also FIGS. 2 and 3), it being understood that the sensing and steering functions could be split between the two casters 18 and 20, or sensors 60 could be positioned on both casters, or both casters could be actively steered. To switch from field mode steering (free rotation of casters 18 and 20) to high speed mode (active steering of caster 18) an operator will activate the caster steering control system 90 via a control input (lever or switch) from the windrower cab 92. In this example the caster steering control system 90 is a hydraulic system as disclosed in U.S. patent application Ser. No. 16/200,324. During field mode operation the caster steering control system 90 allows free flow of hydraulic fluid through the system and steering actuator 30 which permits the free rotation of the caster 18. However, once the high speed mode of operation is invoked, the control system regulates the flow of hydraulic fluid to the steering actuator 30 to apply forces to the caster 18 consonant with the steering inputs to the powered wheels 14 and 16. Before the high speed steering mode can be invoked however, a controller 94, in communication with and adapted to receive signals from the sensor 60, must determine if the casters 18 and 20 are in a position wherein the caster wheels 36 and 38 are behind the rear axle 22. Communication between the sensor 60 and the controller 94 may be via wire as indicated by sensor cable 96, or wirelessly via one of a number of wireless communication protocols. This determination is made when the controller 94 evaluates the signals generated by the sensor 60 indicative of the position of the caster wheels. In this example, sensor 60 detects either the presence (FIG. 4) or the absence (FIG. 5) of the ungrooved portion 66 of shaft 50. If, for example, the signals indicate the presence of the ungrooved portion 66, and the ungrooved portion is sized and positioned on the shaft 50 relative to the position of the sensor 60, the caster wheel 36 and the rear axle 22 such that the caster wheels 36 and 38 are behind the rear axle 22 when the ungrooved portion is detected, then the controller 94 will permit the switch into the high speed mode of active steering by permitting control of the various valves of the caster steering control system 90 which regulate the flow of hydraulic fluid to the steering actuator 30 to apply steering forces to the caster 18. If, however, the signals from the sensor 60 indicate that the groove 64 is detected, then the controller will not permit the switch and the caster steering control system 90 will remain in field mode. The controller 94 may signal this status to the operator via a light or a gauge in the cab 92, allowing the operator to move the windrower 10 forward to bring the casters 18 and 20 into a trailing position behind the rear axle so the high speed mode of operation may be invoked. The controller 94 could be, for example, a stand-alone controller, such as a programmable logic controller mounted on the windrower, or, its functions could be performed by specific algorithms within the steering control system of the windrower.

What is claimed is:
1. A shaft orientation sensor assembly, the assembly comprising:
    a shaft having a groove extending about at least a portion of a circumference thereof;

a bearing defining a bore, the shaft being received within the bore, the shaft being rotatable about an axis oriented coaxially with the bore; and a sensor mounted on the bearing proximate to the groove, the sensor adapted to sense a depth of the groove upon rotation of the shaft and generate signals indicative of the depth of the groove.

2. The sensor assembly according to claim 1, the assembly further comprising:

a wheel arm having first and second ends oppositely disposed; and a wheel attached to the first end of the wheel arm, the wheel being rotatable about a wheel axis, wherein the shaft is fixedly attached to the second end of the wheel arm and oriented transversely to the wheel axis.

3. The sensor assembly according to claim 2, wherein the groove is positioned within the bearing.

4. The sensor assembly according to claim 3, wherein the groove is positioned distal to the second end of the wheel arm.

5. The sensor assembly according to claim 1, wherein the sensor comprises a proximity sensor.

6. The sensor assembly according to claim 5, wherein the sensor is selected from the group consisting of Hall effect sensors, capacitive sensors, inductive sensors, optical sensors and ultrasonic sensors.

\* \* \* \* \*